(12) United States Patent

Leper

(10) Patent No.: US 12,699,897 B2

(45) Date of Patent: Aug. 4, 2026

(54) METHODS AND SYSTEMS FOR NEURAL NETWORK MODEL DISTRIBUTION OF AUTOMATED INTERACTIONS WITH NETWORK EFFECTS AND N-TIERED INCENTIVES VIA INTERACTIVE NETWORKS

(71) Applicant: John Anthony Leper, Kowloon (HK)

(72) Inventor: John Anthony Leper, Kowloon (HK)

( * ) Notice: Subject to any disclaimer, the term of this patent is extended or adjusted under 35 U.S.C. 154(b) by 742 days.

(21) Appl. No.: 17/988,722

(22) Filed: Nov. 16, 2022

(65) Prior Publication Data

US 2023/0259763 A1      Aug. 17, 2023

Related U.S. Application Data

(60) Provisional application No. 63/289,911, filed on Dec. 15, 2021, provisional application No. 63/279,987, filed on Nov. 16, 2021.

(51) Int. Cl.
*G06N 3/08* (2023.01)
*G06N 3/044* (2023.01)
*G06Q 30/0207* (2023.01)

(52) U.S. Cl.
CPC .............. *G06N 3/08* (2013.01); *G06N 3/044* (2023.01); *G06Q 30/0222* (2013.01)

(58) Field of Classification Search
CPC ....... G06N 3/08; G06N 3/044; G06Q 30/0222
See application file for complete search history.

(56) References Cited

U.S. PATENT DOCUMENTS

| | | | |
|---|---|---|---|
| 2013/0190930 A1* | 7/2013 | Yi ...................... | H05K 7/20836 700/276 |
| 2018/0240062 A1* | 8/2018 | Crabtree ............ | G06Q 20/0855 |
| 2020/0143242 A1* | 5/2020 | Lafontaine ............. | G06N 3/045 |

OTHER PUBLICATIONS

Kamali et al. (A Blockchain-Based Spatial Crowdsourcing System for Spatial Information Collection Using a Reward Distribution, published Jul. 29, 2021) (Year: 2021).*

* cited by examiner

*Primary Examiner* — David Yi
*Assistant Examiner* — Syed Rayhan Ahmed

(57) ABSTRACT

In one aspect, a computerized method of an artificial neural network model for implementing a distribution of automated interactions with network effects and n-tiered incentives via an interactive network comprising: training one or more artificial neural network models to automatically: establish a set of specified system-wide data center parameters, wherein the artificial neural network model is trained on a set of existing data sets and is used to automatically determine the specified system-wide data center parameters, receive an item added by a user added to the interactive network, wherein for each item added by the user adds to the system, the user assigns a specific goal, provide a set of data for each specific goals, generate a specified goal algorithm for each goal described by the user, automatically establish a distribution with a plurality of network effects and n-tiered incentives for each item the user adds, and for each transaction related to the item that occurs in the interactive network, apply the specific goal algorithm based on the user's goal.

1 Claim, 11 Drawing Sheets

USER INPUTS DATA AND ESTABLISHES EXACT GOALS
402

USER DATA IS SENT OVER THE INFORMATION NETWORK TO A DATA CENTER
404

DATA CENTER TO ESTABLISH  DISTRIBUTION VIA INTERACTIVE NETWORK FOR GOODS AND SERVICES THAT INCLUDES NETWORK EFFECTS AND N-TIERED INCENTIVES AND MEETS THE USER'S GOALS
406

400

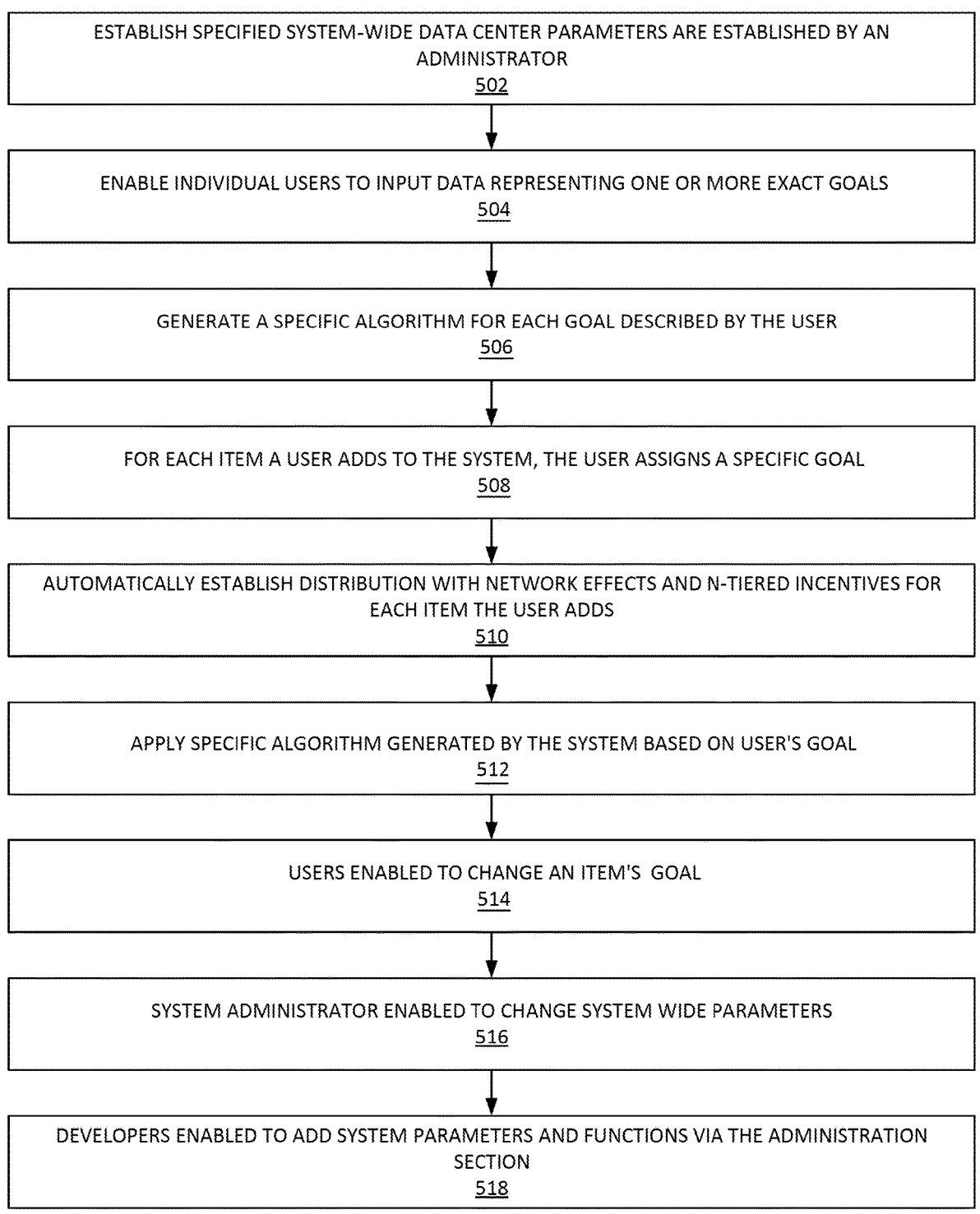

ESTABLISH SPECIFIED SYSTEM-WIDE DATA CENTER PARAMETERS ARE ESTABLISHED BY AN ADMINISTRATOR
502

ENABLE INDIVIDUAL USERS TO INPUT DATA REPRESENTING ONE OR MORE EXACT GOALS
504

GENERATE A SPECIFIC ALGORITHM FOR EACH GOAL DESCRIBED BY THE USER
506

FOR EACH ITEM A USER ADDS TO THE SYSTEM, THE USER ASSIGNS A SPECIFIC GOAL
508

AUTOMATICALLY ESTABLISH DISTRIBUTION WITH NETWORK EFFECTS AND N-TIERED INCENTIVES FOR EACH ITEM THE USER ADDS
510

APPLY SPECIFIC ALGORITHM GENERATED BY THE SYSTEM BASED ON USER'S GOAL
512

USERS ENABLED TO CHANGE AN ITEM'S GOAL
514

SYSTEM ADMINISTRATOR ENABLED TO CHANGE SYSTEM WIDE PARAMETERS
516

DEVELOPERS ENABLED TO ADD SYSTEM PARAMETERS AND FUNCTIONS VIA THE ADMINISTRATION SECTION
518

BLOCKCHAIN/INTERACTIVE NETWORK MODULE
604

ML MODULE
606

API(S)
608

INCENTIVE MODULE
610

BEACON AND CONNECTOR SEARCH OVERRIDE MECHANISM
612

TELL MY NETWORK MODULE
614

600

700

FUNCTION

IF User Clicks "Tell My Network" Button

Prompt user:

☐ Notify my network about this item
  ☐ Add this item to my Platform a) IF "Notify ..." is checked: Issue a communication to the user's network per their communication configuration.

b) IF "Add to Platform" is checked: Item is added to User's Personal PLATFORM to be displayed on their Platform page as well as any other place their ITEMS are displayed (i.e., their individual ITEM pages, live streams, videos, groups, editorial, etc.). If user has added their own ITEMS on the UXM, then by default this item will displayed _after_ user's own ITEMS, subject to rules setup by the user that affect the ranking of the USER's ITEMS.

EXAMPLE: EMAIL NOTIFICATION

Subject Line: You might like this item

Hello [network recipient first name],

I thought you might be interested in this item.

[link to ITEM page]

Best,
[sender's first name]

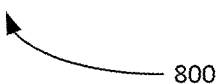

METHODS AND SYSTEMS FOR NEURAL NETWORK MODEL DISTRIBUTION OF AUTOMATED INTERACTIONS WITH NETWORK EFFECTS AND N-TIERED INCENTIVES VIA INTERACTIVE NETWORKS

CROSS-REFERENCE TO RELATED APPLICATIONS

This application claims priority to U.S. Provisional Patent Application No. 63/279,987, filed on Nov. 16, 2021 and titled "A system and method for uniquely Implementing on the spot a distribution system with network effects and n-tiered incentives used to sell goods and services via the Internet, blockchain, and other types of interactive networks". This provisional application is hereby incorporated by reference in its entirety.

BACKGROUND

1. Field

This application relates generally to computer network generation and analysis, and more particularly to a system, method, state machine and article of manufacture for neural network model distribution of automated interactions with network effects and n-tiered incentives via interactive networks.

2. Related Art

There is a need for on the spot establishment of a distribution system with network effects and n-tiered incentives where one did not previously exist. Current methods may require specialized knowledge in multiple fields, a data center, and resources to maintain it, and rely on applying multiple non-integrated systems and components which can be costly, difficult to implement and manage, and require a significant amount of time to implement. It is noted that current systems may require combining multiple methods, which may not be compatible and may be costly, time consuming and difficult to implement. They are also more prone to human error than the method disclosed here. The cost, time, difficulty, and risk involved in implementing other methods may be prohibitive or cause the abandonment of implementation before a successful implementation is achieved.

Accordingly, improvements are desired that require no special knowledge, no data center, no equipment at all, and can be implemented by any individual on the spot. Additionally, improvements are desired that apply highly complex state machine, methods, and systems required to establish distribution with network effects and n-tiered incentives over the Internet and/or another interactive network that meets the user's exact goals on the spot with no need for the user to understand network effects or interactive networks or any of the complexity of the invention itself.

SUMMARY OF THE INVENTION

In one aspect, a computerized method of an artificial neural network model for implementing a distribution of automated interactions with network effects and n-tiered incentives via an interactive network comprising: training one or more artificial neural network models to automatically: establish a set of specified system-wide data center parameters, wherein the artificial neural network model is trained on a set of existing data sets and is used to automatically determine the specified system-wide data center parameters, receive an item added by a user added to the interactive network, wherein for each item added by the user adds to the system, the user assigns a specific goal, provide a set of data for each specific goals, generate a specified goal algorithm for each goal described by the user, automatically establish a distribution with a plurality of network effects and n-tiered incentives for each item the user adds, and for each transaction related to the item that occurs in the interactive network, apply the specific goal algorithm based on the user's goal.

BRIEF DESCRIPTION OF THE DRAWINGS

FIG. 5 illustrates another example process for distribution with network effects and n-tiered incentives via interactive networks, according to some embodiments.

FIG. 8 illustrates another example one-click tell my network button, according to some embodiments.

Figure 1:
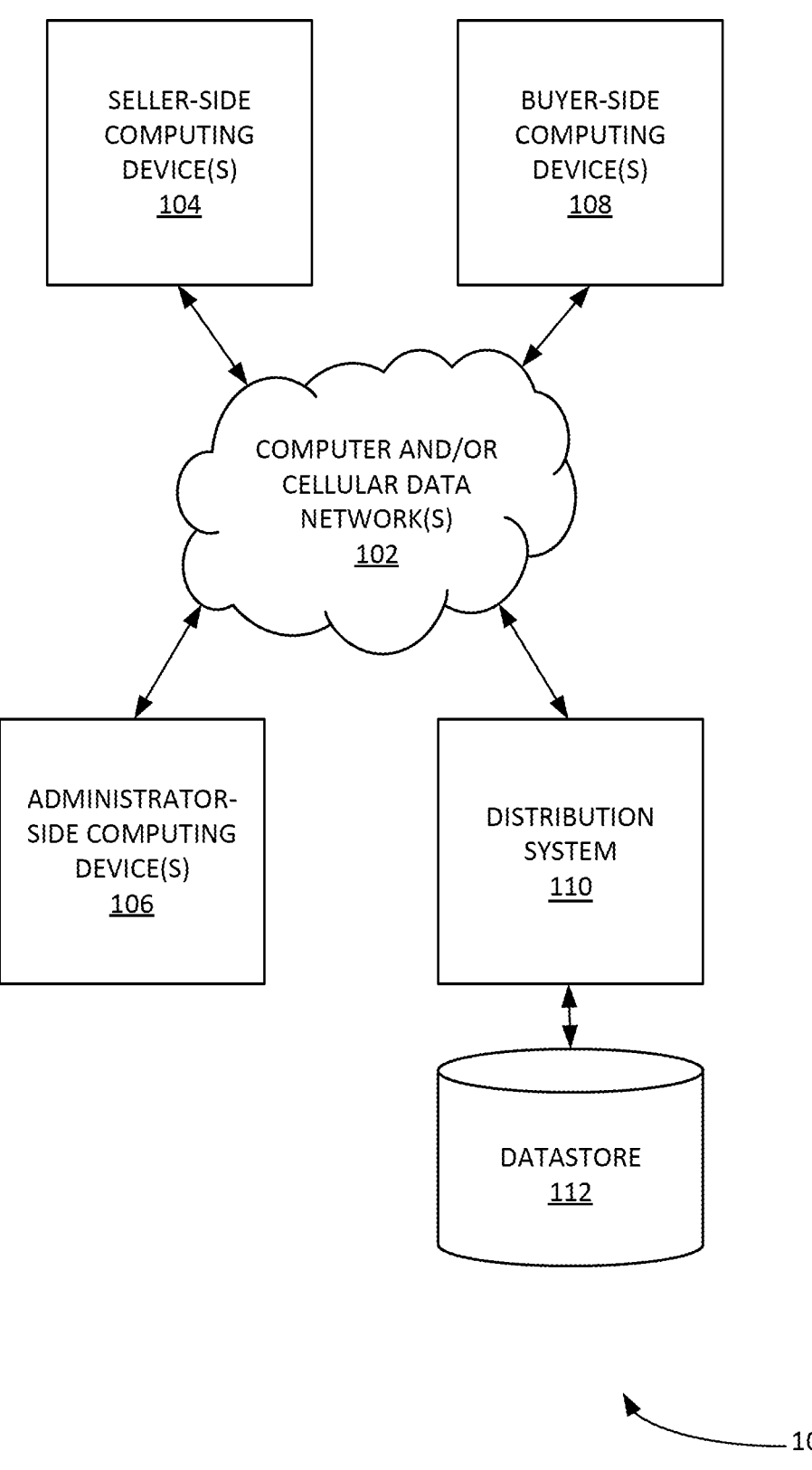
FIG. 1 illustrates an example system for distribution with network effects and n-tiered incentives via interactive networks, according to some embodiments.

The Figures described above are a representative set and are not an exhaustive with respect to embodying the invention.

DESCRIPTION

Disclosed are a system, method, and article of manufacture for distribution with network effects and n-tiered incentives via interactive networks. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Artificial neural networks (ANN) are computing systems inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron receives signals then processes them and can signal neurons connected to it. The signal at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. A hyperparameter of an ANN is a constant parameter whose value is set before the learning process begins. The values of parameters are derived via learning. Examples of hyperparameters include learning rate, the number of hidden layers and batch size. The values of some hyperparameters can be dependent on those of other hyperparameters. For example, the size of some layers can depend on the overall number of layers.

Blockchain is a type of distributed ledger technology (DLT) that consists of growing list of records, called blocks, which are securely linked together using cryptography. Each block contains a cryptographic hash of the previous block, a timestamp, and transaction data (e.g. represented as a Merkle tree, where data nodes are represented by leaves). The timestamp proves that the transaction data existed when the block was created. Since each block contains information about the previous block, they effectively form a chain, with each additional block linking to the ones before it. Consequently, blockchain transactions are irreversible in that, once they are recorded, the data in any given block cannot be altered retroactively without altering all subsequent blocks. Blockchains can be managed by a peer-to-peer (P2P) computer network for use as a public distributed ledger, where nodes collectively adhere to a consensus algorithm protocol to add and validate new transaction blocks. Although blockchain records are not unalterable, since blockchain forks are possible, blockchains may be considered secure by design and exemplify a distributed computing system with high Byzantine fault tolerance.

Cloud computing can involve deploying groups of remote servers and/or software networks that allow centralized data storage and online access to computer services or resources. These groups of remote serves and/or software networks can be a collection of remote computing services.

Deep learning is part of a broader family of machine learning methods based on artificial neural networks with representation learning. Learning can be supervised, semi-supervised or unsupervised.

Deep neural network (DNN) is an artificial neural network (ANN) with multiple layers between the input and output layers. There are different types of neural networks but they always consist of the same components: neurons, synapses, weights, biases, and functions. Deep learning (DL) is a branch of algorithm-based machine learning.

Digital currency can be a currency, money, or money-like asset that is primarily managed, stored, or exchanged on digital computer systems, especially over the internet. Types of digital currencies include cryptocurrency, virtual currency, and central bank digital currency. Digital currency may be recorded on a distributed database on the internet, a centralized electronic computer database owned by a company or bank, within digital files or even on a stored-value card.

Distribution system can include a network of interactions. Each item/node included in a network of interactions in a distribution system can have a type.

Machine learning (ML) can use statistical techniques to give computers the ability to learn and progressively improve performance on a specific task with data, without being explicitly programmed.

Natural language processing, a branch of artificial intelligence concerned with automated interpretation and generation of human language. NLP functionalities and methods that can be used herein can include, inter alia: statistical natural-language processing (SNLP), Lemmatization, morphological segmentation, part-of-speech tagging, stochastic grammar parsing, sentence breaking, word segmentation, terminology extraction, machine translation, named entity recognition, natural language understanding, lexical semantics, relationship extraction, sentiment analysis, word sense disambiguation, automatic summarization, coreference resolution, discourse analysis, speech segmentation, text-to-speech, OCR, speech to text, etc.

Network effect is the phenomenon by which the value or utility a user derives from a good or service depends on the number of users of compatible products. Network can result in a given user deriving more value from a product/service as more users join the same network.

Recurrent neural network (RNN) is a class of artificial neural network where connections between nodes form a directed graph along a sequence. This allows it to exhibit dynamic temporal behavior for a time sequence. Unlike feedforward neural networks, RNNs can use their internal state (memory) to process sequences of inputs.

Example Computer Architecture and Systems

FIG. 1 illustrates an example system 100 for distribution with network effects and n-tiered incentives via interactive networks, according to some embodiments. System 100 can establish, on the spot, a distribution system (e.g. a sales distribution system, etc.) with network effects and n-tiered incentives where one did not previously exist. System 100 can uniquely establish a distribution system. System 100 can establish/manage network effects and n-tiered incentives used to sell goods and services via the Internet, blockchain (e.g. see blockchain/interactive network module 602 of infra), and FIG. 6 other types of interactive networks.

With system 100, an individual or organization can implement an on-the-spot distribution system 110. Distribution system 110 can enable the management of network effects and n-tiered incentives. This can be implemented with adjustable incentives for buyers and network participants at the item level. This allows individuals and organizations (e.g. using seller-side computing device(s) 104, administrator-side computing device(s) 106, buyer-side computing device(s) 108, etc.) to experiment with, and fine-tune network effects in their sales and distribution systems.

Seller-side computing device(s) 104 can enable a seller to create one or more (or select from a set of default) goals (e.g. monetization goals, etc.) and add one or more items to the system, each item must be assigned a goal. These can be managed by distribution system 110 and stored in data store 112. Once these steps are completed distribution system 110 can generate on the spot a distribution system with network effects and n-tiered incentives used to sell the items (e.g. goods and services) via the Internet, blockchain, or another type of interactive network sellers (e.g. using seller-side computing device(s) 104, etc.) can establish goals and add items at any time and independently of each other. At any time, a Seller can assign any goal to any item or change the goal assigned to an item.

System 100 can instantly (e.g. assuming computing, networking and/or other latencies, etc.) establish an interactive distribution system with network effects and n-tiered incentives for a person or organization that has no knowledge or expertise in interactive networks or network effects.

System 100 applies highly complex algorithms (e.g. ML/AI algorithms, implemented using ML module 606, etc.), methods, and systems required to establish distribution with network effects and n-tiered incentives over the Internet or another interactive network that meets the user's exact goals on the spot with no need for the user to understand network effects or interactive networks or any of the complexity of the invention itself. System 100 can be replicated to produce an unlimited number of platforms each applicable and customizable to a specific or non-specific audience.

System 100 involves three core user roles, those being Administrator, Seller and Buyer. A user of the system can have more than one role. System 100 hooks provide developers the ability to add additional user roles and modify all role functions. Distribution system 110 (e.g. see Distribution system 600 infra as an example, etc.) is initialized (e.g. step 502 infra) by an administrator (e.g. using administrative-side computing device 106, etc.) inputting data that establishes system-wide macro parameters. These macro parameters define various attributes of the system including the distribution of incentives, ratios affecting discounts and commissions, and usage fees. These macro parameters can be variable and can be changed by the administrator (e.g. step 516 infra) . Distribution system 110 has a set of default values for all macro parameters. Distribution system 110 also provides hooks that allow developers to add new macro parameters and functions (e.g. step 518 infra) for customization or modification.

Individual Sellers input data (e.g. step 504 infra) representing one or more exact goals. For each goal (e.g. a monetization goal, etc.) a user only needs to (e.g. step 506 infra) input their desired goal. Generally, this requires the user to input only one or two figures. A set of default goals exists, so that a Seller may select from the default list. Sellers add one or more items to the system (e.g. step 508 infra) and assign a goal to each item. Goals are organized by type. Administrators can add new types. Sellers then select the type and input the goal. The core system includes, but is not limited to, three types of goals. Applying type one goal the user only needs to input the exact net profit desired from a transaction. Using this data, the system outputs (e.g. step 510 infra) exact pricing, commission distributions, and transaction fee values and any other output required including custom outputs for any item that this specific goal is assigned, to implement on the spot a distribution system with network effects and n-tiered incentives (e.g. step 512 infra).

A transaction occurs when a Buyer purchases an item triggering system 100 to update the ledgers of all related parties within the network. Applying a type two goal the Seller inputs only two figures, the discount and total commission values. Using this data, the system, using the input data applies a set o f algorithms that perform the same output functions as in a type one goal. In a type three goal, the Seller only inputs a commission amount and the system, using the input data, applies a set of algorithms that perform the same output functions as in type one and type two goals. Sellers may change the goal (e.g. step 514 infra) for an item.

Figure 2:
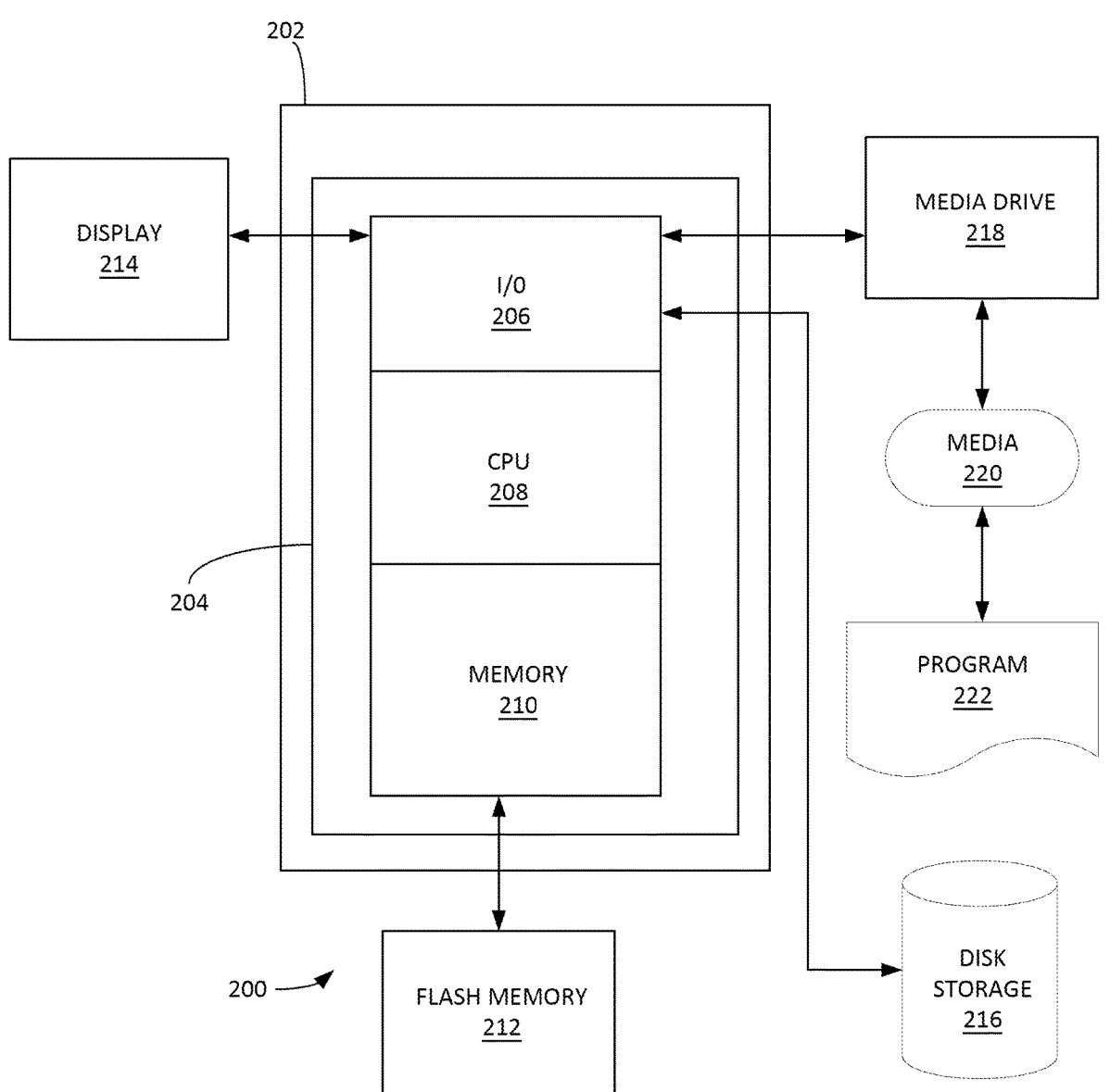
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
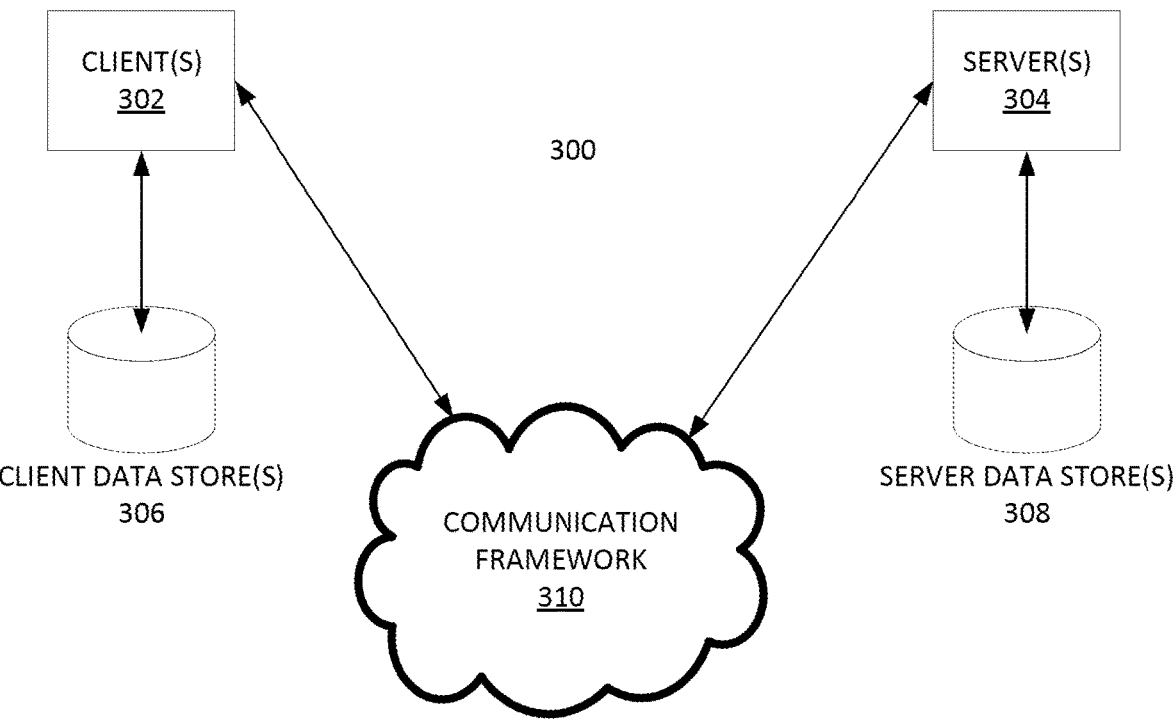
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Example Methods

Various methods are now discussed.

Figure 4:
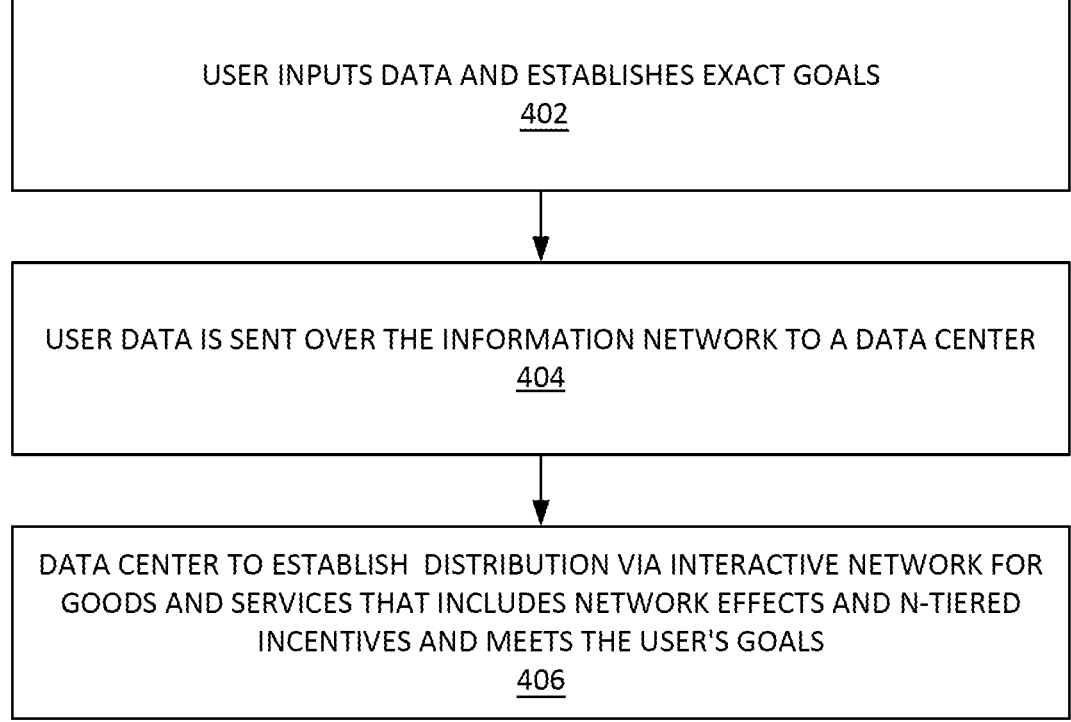
FIG. 4 illustrates an example process for establishing a distribution system that includes network effects and n-tiered incentives used to sell goods and services via the Internet, blockchain, and other types of interactive networks, according to some embodiments.

FIG. 4 illustrates an example process 400 for establishing a distribution system that includes network effects and n-tiered incentives used to sell goods and services via the Internet, blockchain, and other types of interactive networks, according to some embodiments. Process 400 can be used to establish, de novo, a distribution system with network effects and n-tiered incentives. In step 402, a user inputs data into the system that establishes exact goals. In step 404, the user data is sent over the information network to a data center. In step 406, process 400 can, utilizing the data input by the user, instruct the data center to establish distribution via Internet, blockchain, and/or another interactive network for goods and services that includes network effects and n-tiered incentives and meets the user's goals.

FIG. 5 illustrates another example process 500 for neural network model distribution of automated interactions with network effects and n-tiered incentives via interactive networks, according to some embodiments. In step 502, process 500 establishes specified system-wide data center parameters are established by an administrator. In some examples, a neural network model can be trained on existing data sets and used to automatically determine the specified system-wide data center parameters.

In step 504, process 500 enables individual users to input data representing one or more exact goals. In some examples, another neural network model can be trained on existing data sets and used to automatically determine and the parameters of the exact goals in lieu of and/or in addition to the user inputs in this step.

In step 506, using user input data, process 500 generates a specific algorithm for each goal described by the user. In some examples, another neural network model can be trained on existing data sets and used to automatically determine and the parameters of the user goal in lieu of and/or in addition to the user inputs in this step.

In step 508, for each item a user adds to the system, the user assigns a specific goal. In some examples, another neural network model can be trained on existing data sets and used to automatically determine and the parameters of the user goal in lieu of and/or in addition to the user inputs in this step.

In step 510, process 500 automatically establishes distribution with network effects and n-tiered incentives for each item the user adds. In some examples, another neural network model can be trained on existing data sets and used to automatically optimize the parameters of the distribution with network effects and n-tiered incentives for each item the user adds.

In step 512, for each sales transaction that occurs, process 500 applies the specific goal algorithm generated by the system based on user's goal. In some examples, another neural network model can be trained on existing data sets and used to automatically optimize the parameters of the specific goal algorithm.

In step 514, users may change an item's goal. In step 516, a system administrator may change system wide parameters. In some examples, another neural network model can be trained on existing data sets and used to automatically determine and the system parameters in lieu of and/or in addition to system administrator inputs in this step.

In step 518, developers may add system parameters and functions via the administration section. In some examples, another neural network model can be trained on existing data sets and used to automatically determine and the system parameters in lieu of and/or in addition to developer and/or administrator inputs in this step.

Process 500 can be implemented using various ML techniques. For example, neural networks can be used to establish the parameters utilized in step 502. Process 500 can use the various ML techniques provided in the MACHINE LEARNING IMPLEMENTATIONS section discussed infra as well.

Figure 6:
FIG. 6 illustrates an example distribution system, according to some embodiments.

FIG. 6 illustrates an example distribution system 600, according to some embodiments. Distribution system 600 can be used to implement distribution system 110 discussed supra. Distribution system 600 can include blockchain/interactive network module 604. Blockchain/interactive network module 604 can maintain the blockchain and/or other distributed ledger system utilized herein. Blockchain/interactive network module 602 can establish/manage network effects and n-tiered incentives used to sell goods and services via the Internet, blockchain, etc. Blockchain/interactive network module 604 can implement the one click networking functionality discussed infra.

ML module 606 can implement various AI/ML functionalities and systems to automate and/or optimize aspects of system 600, process 100-200, etc. Various machine learning (ML) methods can be used to implement process 400, process 500, etc. as well. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, which is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

APIs 608 can enable third-party systems to access system 600. These include various enterprises that utilize distribution with network effects and n-tiered incentives via interactive networks. These include various enterprises that utilize the processes provided herein (e.g. process 100, process 200, etc.).

Incentive module 610 can implement process 900 and 1000.

One Click Networking Functionality

Figure 7:
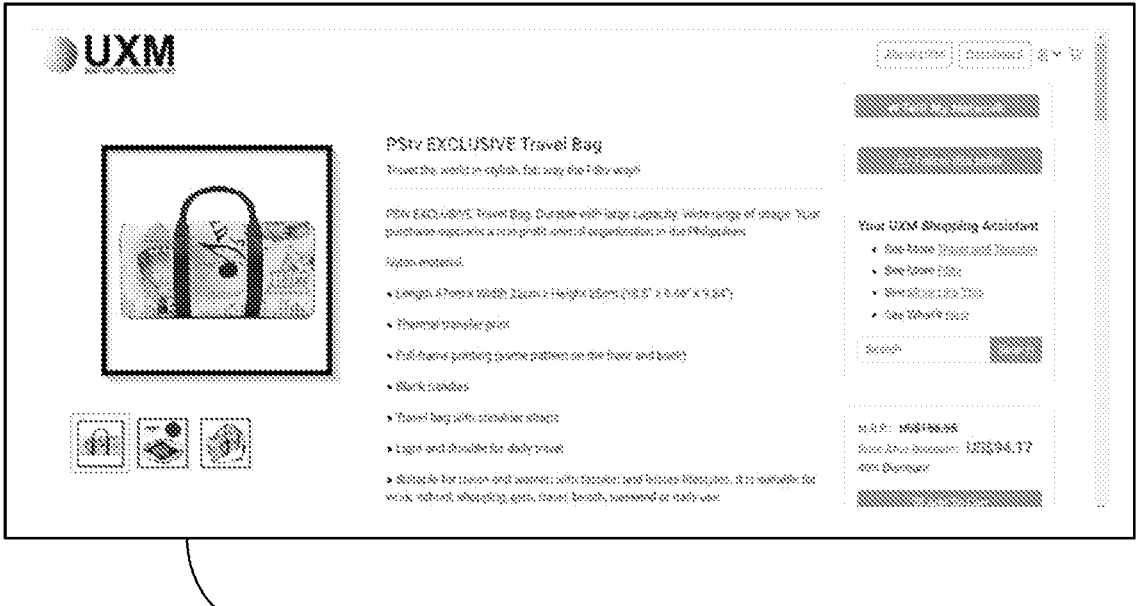
FIG. 7 illustrates an example one-click tell my network button, according to some embodiments.

FIG. 7 illustrates an example one-click tell my network button functionality, according to some embodiments. FIG. 8 illustrates another example one-click tell my network button, according to some embodiments. Functions are combined in the examples of FIG. 7 and FIG. 8.

Tell My Network module 614 can be used to implement the one-click networking functionality. Tell My Network module 614 can feature/manage a button that is displayed along with any item that has been added to the network by any user of the network. When any user is viewing a specific item on the network, Tell My Network module 614 can cause the Tell My Network button to appear on a web interface. If the viewing user clicks the button, then every individual in the user's personal network can be sent a communication advising them to view the item.

The communication can have a default configuration which each individual user can modify and personalize. The means of communication can be of any form, including but not limited to, email, web notification, mobile text message, intra-network communication, app messaging, online display (e.g. see infra) etc. The communication message itself can be created and edited by the user. Button communication rules can be established and modified by the user as well using an interface provided by Tell My Network module 614. The macro parameters of the communication rules can be established and modified by the network administrator (e.g. utilizing Tell My Network module 614). All communication rule sets include a message recipient rule that allows the user to define who, within the user's personal network will receive the communication based on their network relation to the user, for example, if a network was established to connect and track five (5) levels of network effect, the user may select any, all, or none of the users at each level to receive the notification.

Users use an administrative dashboard to configure their communications. Each user can have multiple configurations of the button. In the case of having more than one button configuration the user can be prompted which configuration to use for the 1-Click Tell My Network communication.

The tell my network button provided by Tell My Network module 614 can also allow a user to notify others of the item via the user's online network platform within the network (e.g. see the "Add To My Platform" function provided by Tell My Network module 614) 1-Click Add To My Platform/ 1-Click Add To My Web Store function.

Tell My Network module 614 can cause the Tell My Network button to be displayed along with any item that has been added to the network by any user of the network. When any user is viewing a specific item on the network, this button will appear. If the viewing user clicks the button, then that item gets added to the viewing user's platform within the network.

In one implementation, a user of the network may desire to add an item that was added to the network by another user of the network, to their own personal platform within the network. The item would then be added to the user's personal platform so that visitors to the user's platform can view the item. A specific example might be a user of the network who does not sell products who wishes to populate their platform with items that are for sale, so that the user can have the opportunity to earn commissions on the sale of items offered. In this way, network users can on-the-spot build a store with a curated selection of goods. This feature could also be triggered with 1-Click Tell My Network Button (e.g. as shown in FIG. 7, etc.).

Figure 9:
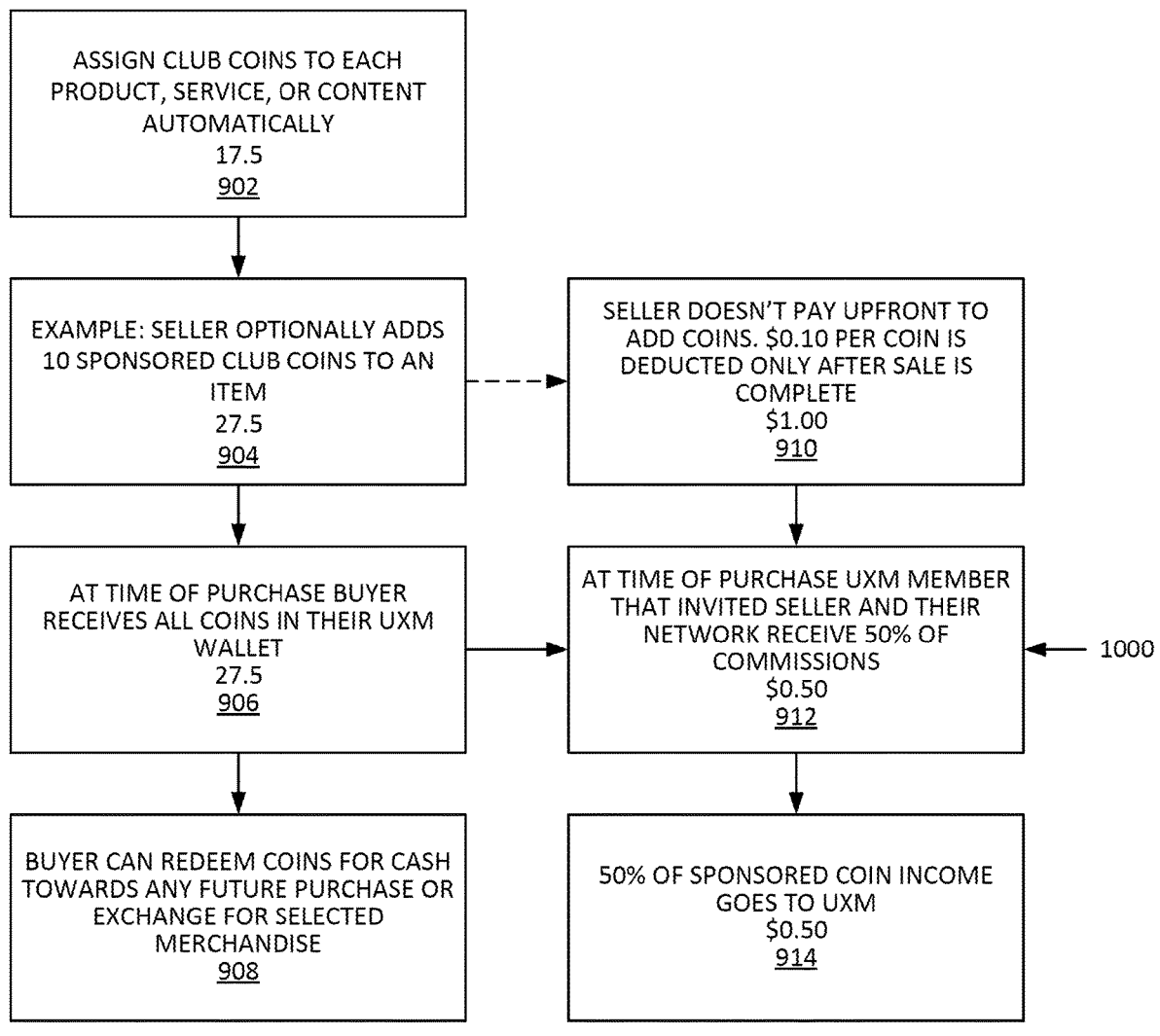
FIG. 9 illustrates an example process of an instant network plus network effect rights, according to some embodiments.

FIG. 9 illustrates an example process 900 of an instant network plus network effect rights, according to some embodiments. It is noted that various functions are combined in this example. Sponsored coins (e.g. a decentralized digital currency, etc.) can provide added incentive(s) for customers to buy and increase item exposure on the sponsored coins generate revenue for the network member and their network who invited the Seller to the network (e.g. a distribution system network, etc.).

More specifically, in step 902, process 900 can assign club coins to each product, service, or content automatically. In step 904, process 900 can enable the seller to optionally add n-number (e.g. ten (10)) sponsored club coins to an item. In step 906, at the time of purchase, the buyer receives all coins in their electronic wallet (e.g. a distribution system digital wallet, etc.).

In step 908, a buyer can redeem coins for cash towards any future purchase or exchange for selected merchandise. In step 910, the seller does not pay upfront to add coins. Per coin is deducted only after sale is complete. In step 912, at time of purchase member that invited seller and their network receive fifty percent (50%) of commissions. Step 912 can receive information from the elements of process 1000 as shown.

In step 914, fifty-percent (50%) of sponsored coin income goes to the owner of system 100 (e.g. owner of distribution system, etc.). It is noted that the percentages of processes 900 and 1000 (infra) are provided by way of example and not of limitation. Processes 900 and 1000 can be another example implementation of an instant network plus network effect right.

Figure 10:
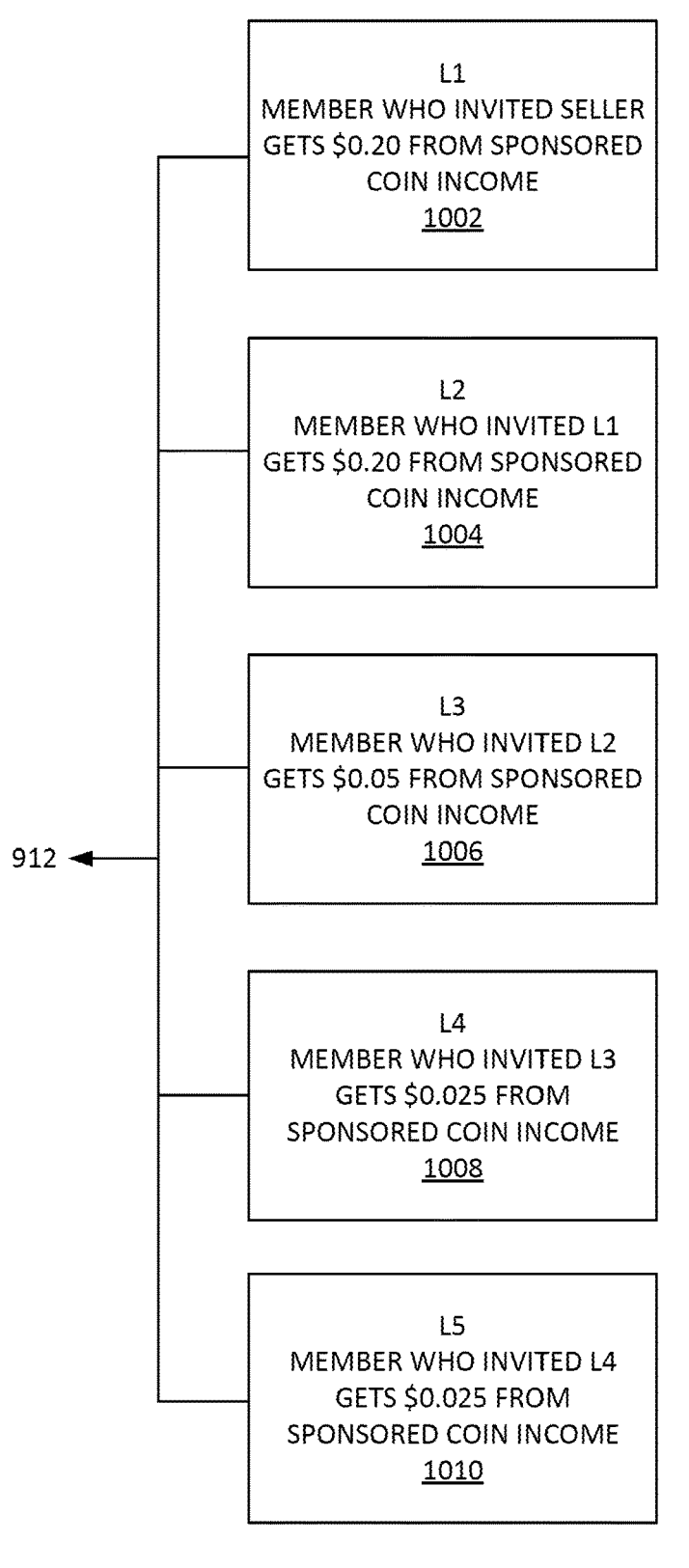
FIG. 10 illustrates an example set of additional elements integrated into process 900, according to some embodiments.

FIG. 10 illustrates an example set of additional elements 1000 integrated into process 900, according to some embodiments. These elements 1002-1010 can be integrated into step 912. Element L1 1002 comprises a member who invited seller receives a specified amount (e.g. $0.20) from sponsored coin income. Element L2 1004 comprises a member who invited element L1 and receives $0.20 from the sponsored coin income. Element 1002 comprises a member who invited element L2 and receives $0.05 from sponsored coin income. Element L4 108 comprises member who invited L3 receives $0.025 from sponsored coin income. Element L5 1010 comprises a member who invited element L4 and receives $0.025 from sponsored coin income.
Example Use Cases An example use case is now discussed. The example use case includes an instant network plus network effect rights implementation. In a first example implementation of the instant network plus network effect rights implementation, users can be rewarded for purchases (e.g. a network member buys something) made by members of their network.

In a second implementation, users can also be rewarded for sales (e.g. a network member sells something) made by members of their network. This can be significant for users who have major sellers in their network. These can include, by way of example, various major brands, merchants, celebrities, etc.

Figure 11:
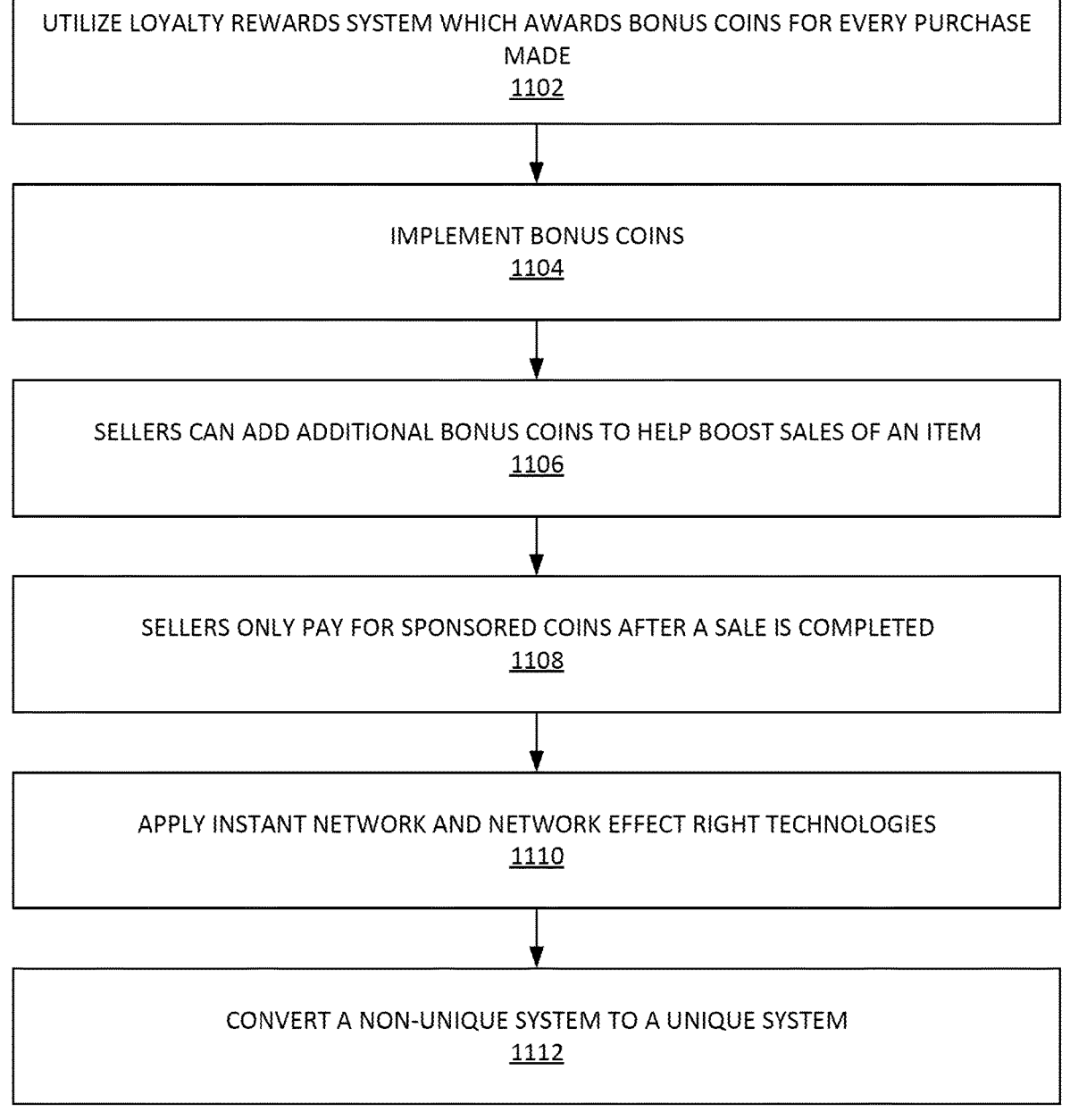
FIG. 11 illustrates an example Bonus Coin process, according to some embodiments.

FIG. 11 illustrates an example Bonus Coin process 1100, according to some embodiments. The present use case can be separated from its network effect rewards system. System 100 (and/or the various methods and/or processes provided herein) can also utilize a loyalty rewards system which awards Bonus Coins for every purchase made on the system 100 in step 1102. These Bonus Coins can be used by Sellers to add additional incentive for buyers to purchase selected items.

The Bonus Coin program is made unique with the addition of system 100 functionalities. Examples of such functionalities are now discussed using process 1100.

In step 1104, various Bonus Coin implementations are performed. In one example, system 100 can automatically assign Bonus Coins to each item. When an item is purchased, the User who purchased the item receives the Bonus Coin amount in their account, and these bonus coins can be redeemed for cash or merchandise based various promotional programs. Very similar to frequent flyer miles.

In step 1106, Sellers can add additional Bonus Coins to help boost sales of an Item. These additional Bonus Coins are referred to as Sponsored Coins. In step 1108, Sellers only pay for Sponsored Coins after a sale is completed.

In step 1110, process 1100 can apply system 100's instant network and network effect right technologies. Users can receive commissions for all Sponsored Coins purchased by Sellers who are in their network. Users can utilize the same n-tier network effect rewards system that applies to purchases made in their network. In step 1112, process 1100 can be used to convert a non-unique system (e.g. a frequent flyer miles or loyalty rewards program, etc.) to a unique system.
Example Beacon and Connector Search Override Mechanism Beacon and connector search override mechanism 612 can be integrated into distribution system 110. Beacon and connector search override mechanism 612 can be used to modify the results generated by a search ranking system. Beacon and connector search override mechanism 612 can use rules set forth by an entity other than the entity that set the rules for the search ranking system.

In one example use case, each item has an owner. The owner is the account through which an item was added to the distribution system. For example, a bookstore owner can be the owner adds a book can be the item. A person interested in 1970s rock music can be the owner and starts a discussion group that can be the item on the subject.

Each item on the distribution system has a type. Current types can include, inter alia: product, show, (discussion) group, video, audio, image, embeddable, editorial, chat room, more to come. When an item that has been posted on the distribution system is selected to be viewed by a user, that item is displayed on an item detail page. On that item detail page, after (or alongside) the item details, a catalogue listing of other items is also displayed. The selection and ranking of these catalogue items is generated by a set of system wide algorithms developed by the distribution system. However, the item owner of the item that is displayed on the item detail page, has the option to override the distribution system developed search algorithm for the purpose of selectively displaying specific items at the top of the catalogue ranking for this item detail page. To utilize the override option the item owner may assign one or more beacons to a specific item.

In one example, a user assigns a beacon id to an item by clicking "add beacon" during item setup (or edit) and the system generates the beacon id for that specific item. Each beacon has a set of access permissions to be assigned by the item owner (e.g. owner, authorized users, anyone, no one (disable).

Each beacon can have one or more sort levels, each with its own rules if applicable (e.g. sort level 1 shows first, sort level 2 shows next, etc.). Then after all item owner beacons and sort levels have displayed, the system wide sort generated items display. If the user who is the owner of a beaconed item, or another user wants to connect specific items to the beaconed item, they would create a beacon connector by clicking "add beacon connector" to an item during setup or edit and input the beacon code of the item they want to connect to.

In one example distribution system use case, if an item owner with a bookstore wants to associate a specific book product with a specific discussion group they created, they would create a beacon for the discussion group on the "add item/content" form, and then input that beacon id as the connector id for the book product. The result will be that every time the Discussion Group is displayed the Book will be displayed in the top of the search results that display after or alongside of the group.

In another example use case, if an item owner with a clothing store is selling matching pants and shirt separately, the user could use the same method as above to have the matching items display before the default search items display.

In another example use case, if the book store owner mentioned in the above example above wants to give permission to another distribution system user to display her Items at the top of the search ranking for his group, he could generate a beacon id for his group and give it a permission to be used by an authorized user, then give the beacon id to the other user who would then input that beacon id as the connector id for the item(s) she wants to be displayed at the top of the search results for the book store owners Group. This scenario can also be used by beacon owners to sell the top ranked search positions for their items (e.g. an artist performing a live music concert on the distribution system can sell sponsorship spots, and the sponsor's items would rank first along side the show. This function has not yet been implemented on the live distribution system platform (in development).

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. Finally, the test dataset is a dataset used to provide an unbiased evaluation of a final model fit on the training dataset. If the data in the test dataset has never been used in training (e.g. in cross-validation), the test dataset is also called a holdout dataset. Processes 100 and 200 can take an idea and convert to a set of application on the fly. In some examples, applications can be created on the fly during the conference call while the users discuss it. In this way, users can iterate through various versions of the application and/or debug in real time (e.g. assuming networking and processing latencies, etc.). In this way, a conference call can be converted into a functioning application. Stochastic neural networks originating from Sherrington-Kirkpatrick models are a type of artificial neural network built by introducing random variations into the network, either by giving the network's artificial neurons stochastic transfer functions, or by giving them stochastic weights.

Process 500 and system 100 can use the example ML implementations provided herein in some example embodiments. In this way, ML models can be trained, verified, and updated. These ML models can be used to automatically calculate and input ML optimized parameters in lieu of developer, user and/or system administrator input(s).

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method for operating a distribution platform that implements network effects and n-tiered incentives via an interactive network, the method comprising:

receiving, from an administrator account via an administration section, macro parameter data establishing system-wide parameters that define at least incentive distribution parameters, discount parameters, commission parameters, and usage fee parameters, wherein the macro parameter data is changeable via the administration section;

receiving, from a seller account, goal data representing an exact goal for an item, and receiving item data for adding the item to the distribution platform, wherein the seller account assigns the exact goal to the item;

generating, by one or more processors of the distribution platform, output values for the item including pricing values, commission distribution values, and transaction fee values for implementing the exact goal based on the goal data and the macro parameter data;

publishing the item on an item detail page of the interactive network that also displays a catalogue listing of other items, wherein selection and ranking of the catalogue listing is generated by one or more system-wide algorithms;

receiving a beacon assignment for a beaconed item, generating a beacon identifier for the beaconed item, and storing beacon access permissions for the beacon identifier, wherein the beacon access permissions include at least one of owner, authorized users, anyone, or no one;

receiving, for a connected item, a beacon connector created by inputting the beacon identifier for the beaconed item as a connector identifier for the connected item;

in response to displaying the item detail page for the beaconed item, when the beacon access permissions authorize use of the beacon identifier, overriding the one or more system-wide algorithms by selecting and ranking one or more connected items at a top of the catalogue listing according to one or more sort levels each having at least one rule, and after connected items are displayed according to the one or more sort levels, displaying additional items ranked by the one or more system-wide algorithms, and when the beacon access permissions are set to no one, disabling the overriding;

displaying, with the item on a user interface, a selectable tell-my-network control that, when selected by a viewing user, transmits a communication advising recipients in a personal network of the viewing user to view the item, wherein the communication has a default configuration that is modifiable and personalizable by the viewing user, and wherein the communication is transmitted via at least one of email, web notification, mobile text message, intra-network communication, app messaging, or online display;

receiving, via an administrative dashboard, communication rule data for the tell-my-network control, wherein the communication rule data includes a message recipient rule that selects which recipients in the personal network receive the communication based on a network relation level, including selecting any, all, or none of users at each network relation level;

storing a plurality of button configurations for the tell-my-network control for the viewing user, and when more than one button configuration exists, prompting the viewing user to select a button configuration for transmitting the communication;

receiving, via the administrative dashboard, user-edited message content for the communication;

in response to selection of the tell-my-network control by the viewing user, adding the item to a platform of the viewing user within the distribution platform such that visitors to the platform can view the item; and upon a transaction in which a buyer account purchases the item, assigning coins to the item and crediting the coins to an electronic wallet of the buyer account at a time of purchase, enabling redemption of the coins for cash toward a future purchase or exchange for selected merchandise, applying the commission distribution values and the transaction fee values by updating ledgers of related parties within a network, and when sponsored coins are associated with the item, deducting a per-coin amount from the seller account only after the sale is complete and distributing sponsored coin income among at least (i) one or more network members in an inviter chain associated with the seller account and (ii) an owner of the distribution platform.

* * * * *